(No Model.)
E. B. STIMPSON, Jr.
MACHINE FOR SETTING LACING STUDS.
No. 349,412. Patented Sept. 21, 1886.
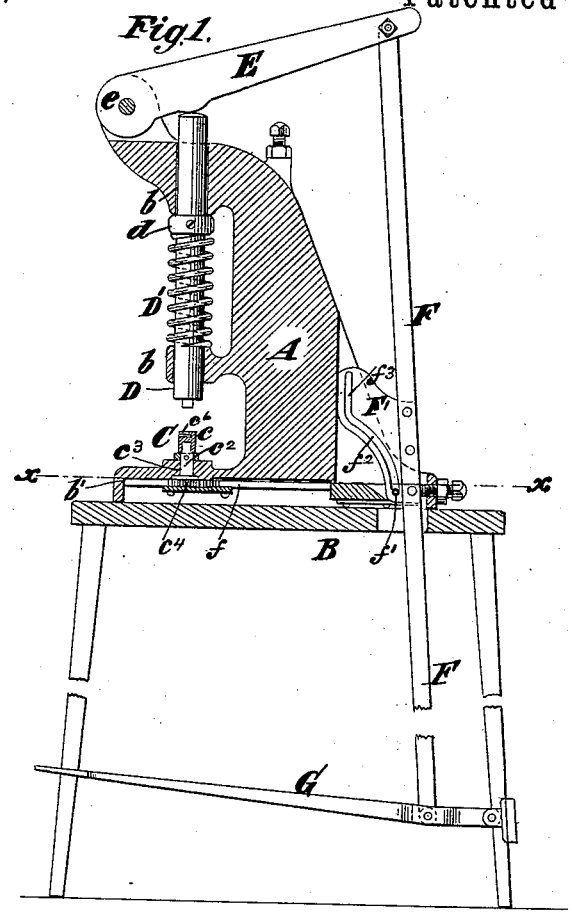
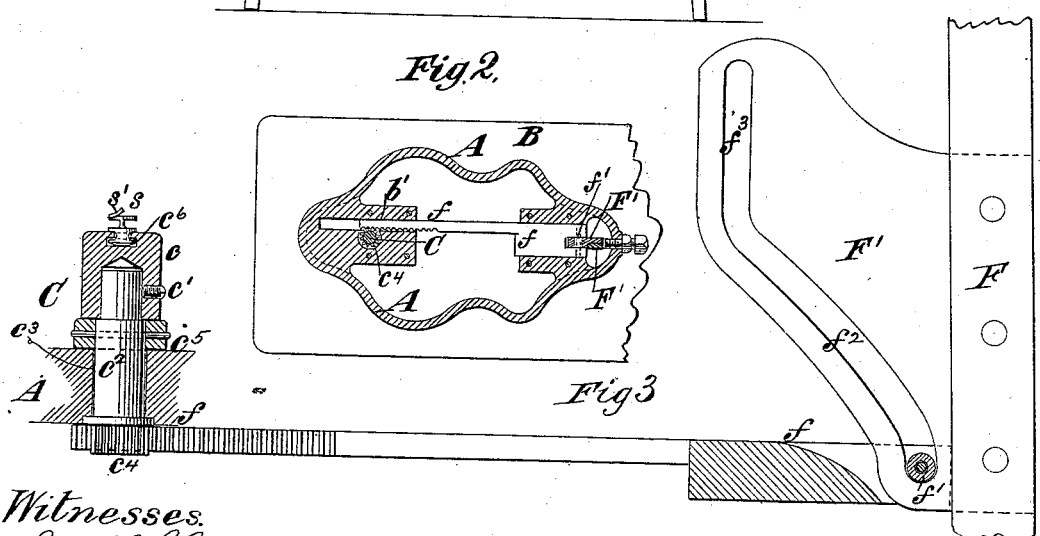
Witnesses:
Emil Herter
C. Sundgren
Inventor:
Edwin B. Stimpson Jr
by his Attys
Brown & Hall

UNITED STATES PATENT OFFICE.

EDWIN B. STIMPSON, JR., OF BROOKLYN, NEW YORK.

MACHINE FOR SETTING LACING-STUDS.

SPECIFICATION forming part of Letters Patent No. 349,412, dated September 21, 1886.

Application filed July 6, 1886. Serial No. 207,204. (No model.)

*To all whom it may concern:*

Be it known that I, EDWIN B. STIMPSON, Jr., of Brooklyn, in the county of Kings and State of New York, have invented a new and useful Improvement in Machines for Setting Lacing Studs or Hooks, of which the following is a specification.

Laced shoes are now largely provided with lacing studs or hooks, the stud or hook being retained in the leather by clamping the leather between two flanges upon the hook or stud, and in order to insert and secure such hooks or studs in the leather the lower or bottom flange of the hook or stud has in it a radial or tangential cut, and a portion thereof is bent up or outward from the flange in the direction of the shank to form a prong or spur. In inserting these hooks or studs the hook or stud is placed in a rotary and upwardly-presented mandrel with its prong or spur presented upward, and the leather, having a small hole previously formed in it by punching, is forced onto the prong or spur of the stud, and the mandrel, with the stud, is then rotated to screw or turn the stud into the leather. By a setting-punch, which is then forced down upon the bottom of the hook or stud, the prong or spur thereof is returned to its normal position coincident with the flange from which it is formed, and the securing of the stud in the leather is thereby completed.

In the machines heretofore constructed for the above purpose the lacing stud or hook has been held in the mandrel by means of a chuck, requiring a separate operation by hand to close it upon the stud or hook. The mandrel has then been turned by means of a foot-treadle or otherwise, in order to turn the hook or stud into the leather, and the setting-punch has then been brought down by hand or otherwise, in order to set the prong or spur of the stud back to its original position in the same plane with the flange from which it is formed, and afterward the foot-treadle has been operated to turn the mandrel backward to its original position for receiving another hook or stud.

The objects of my invention are to provide a machine in which the hook or stud will not require to be clamped and held by a chuck in the mandrel; but may be simply slipped into a slot or recessed groove in the face thereof, and also to so connect the mechanism for rotating the mandrel, and for forcing down the setting-punch, that the first operation of such mechanism by a treadle or otherwise will rotate the mandrel and perform a partial movement of the setting-punch, while the continuation of such movement will hold the mandrel stationary and complete the movement of the setting-punch downward upon the stud or hook.

This machine will be hereinafter fully described in connection with the accompanying drawings; and the invention consists in novel combinations of parts, which are hereinafter described, and pointed out in the claims.

In the drawings, Figure 1 is a sectional elevation of a machine embodying my invention. Fig. 2 is a horizontal section upon the plane of the dotted line $x$ $x$, Fig. 1, illustrating mechanism for imparting rotary motion to the mandrel. Fig. 3 is a sectional elevation in the same plane as Fig. 1, but upon a larger scale, of a portion of the bed, the mandrel, and its operating mechanism; and Fig. 4 is a face view of the mandrel.

Similar letters of reference designate corresponding parts in all the figures.

A designates the frame of the machine, which may be mounted upon a table or other support, B.

C designates the mandrel, and D the oppositely-arranged setting-punch, which is here represented as fitted to reciprocate vertically in guides $b$ in the frame A.

E designates a lever, which is fulcrumed at $e$ in the frame A, and has a bearing upon the top of the setting-punch D, and this lever may be operated through a rod, F, extending downward and connected with a treadle, G. The downward movement of the rod F, which is produced by the treadle G, serves to lower the setting-punch D and bring it downward upon the hook or stud, and it also serves, through mechanism to be described, for producing the desired rotary motion of the mandrel C, necessary to turn the hook or stud into the leather.

Around the punch D, and arranged between one of the guides $b$ and the collar $d$ upon the punch, is a spring, D', which serves to return the punch upward after operation, and also to turn the mandrel C backward to position for receiving another hook or stud.

The construction of the mandrel C and the way in which it is held in the frame A of the press and operated are best illustrated in Fig. 3. The mandrel C comprises an upper portion, $c$, which may be secured by a set-screw, $c'$, to the upright shaft $c^2$, and this upright shaft or body portion of the mandrel is fitted to a bearing, $c^3$, in the frame A.

Upon the body portion or shaft $c^2$ of the mandrel C, and below the frame A, is a pinion, $c^4$, with which engages a rack-bar, $f$, for turning the mandrel, and this rack-bar is arranged to reciprocate in a horizontal slideway, $b'$, formed in the frame A, as shown in Fig. 2. The body portion or shaft $c^2$ of the mandrel may have secured upon it by a screw, pin, or otherwise, a collar, $c^5$, which serves to hold it in its bearings $c^3$ when the mandrel proper or top portion, $c$, is removed.

In the top portion, $c$, or mandrel proper, is a slot or recessed or rabbeted groove, $c^6$, which is of a form to receive a lacing-stud, $s$. (Shown in Fig. 3.) Inasmuch as this upper portion or top $c$ is readily removable, it will be understood that a number of such portions having slots or grooves $c^6$, of different sizes or forms, may be interchangeably fitted to the body portion or shaft $c^2$ of the mandrel as may be necessary or desirable. As best shown in Fig. 4, I prefer to make the slot or recessed groove $c^6$ curved in a horizontal direction, and then the turning of the mandrel, which is done to turn or screw the hook into the leather, will not have any tendency to throw the stud or hook out of the groove $c^6$, but will tend to draw the stud or hook to the inner end of the groove and to the center of the mandrel.

Upon the rod F, I have represented a cam, F', which, as here shown, comprises or has formed in it a cam-slot engaging a pin or roller, $f'$, upon the rack-bar $f$. This slot comprises a curved or inclined portion, $f^2$, and a straight or idle portion, $f^3$, above the curved or inclined portion.

The rack-bar $f$ and the pinion $c^4$ constitute one form of gearing on which the cam acts to turn the mandrel.

The operation of the machine is very simple. The parts being in the position shown in Fig. 1, a lacing hook or stud, $s$, is placed in the slot or recessed groove $c^6$, the leather is forced onto the prong $s'$ of the stud, (see Fig. 3,) and the foot is then pressed upon the treadle G. During the first and principal portion of the downward movement of the rod F, which is produced thereby, the curved or inclined portion $f^2$ of the cam-slot acts upon the pin or roller $f'$ of the rack-bar $f$, and by moving said bar lengthwise rotates the mandrel C, and turns the stud or hook into the leather. The setting-punch D is moving downward during this operation; but before the end of the punch reaches the hook or stud $s$ the straight or idle portion $f^3$ of the cam-slot comes to the pin or roller $f'$, and thereafter during the downward movement of the rod F no movement is transmitted to the rack-bar $f$, and the mandrel C is held stationary while the setting-punch completes its movement, and is forced downward upon the hook or stud. As soon as the pressure of the foot is removed from the treadle, the spring D' carries the setting-punch upward or returns it, and the same spring automatically turns the mandrel C in a reverse direction, or backward to position to receive another hook or stud.

It will be understood from the above description that my machine is very simple in construction, and that no clamping of the hook or stud in the mandrel by means of a chuck is necessary. All that is required is to simply slip the hook or stud in the slot or groove $c^6$, then force the leather over the prong or spur of the hook or stud, and, finally, press down upon the treadle G. As soon as pressure on the treadle is removed, the setting-punch, the mandrel, and the treadle are all at once returned to their former position, ready for the introduction of another hook or stud.

It will be obvious that the advantages of my invention in so far as they result from the turning of the mandrel and the movement of the setting-punch by one operation of the treadle, may be secured by a machine in which the hook or stud is held by a chuck on the mandrel C, instead of in a simple groove, $c^6$.

What I claim as my invention, and desire to secure by Letters Patent, is—

1. The combination, with a mandrel to receive a stud, and a setting-punch movable opposite the mandrel, of a rod and lever for operating the punch, a cam operated simultaneously with the movement of the rod, and gearing, substantially as described, whereby the rod and cam during a portion of their operative movement transmit rotary motion to the mandrel, substantially as herein set forth.

2. The combination, with a mandrel to receive a stud and a setting-punch movable opposite the mandrel, of a rod and lever for operating the punch, a cam operated simultaneously with the movement of the rod, and gearing, substantially as described, whereby the said rod and cam during a portion of their operative movement transmit rotary motion to the mandrel, and a spring serving both to return the punch and to give the mandrel a return rotary motion after each operation, substantially as herein set forth.

3. The combination, with the mandrel to receive a stud, and a reciprocating setting-punch opposite the mandrel, the mandrel having a pinion upon it, of a rod and lever, whereby the punch is operated, a rack-bar engaging the mandrel-pinion, and a cam on said rod for operating the rack-bar, and which comprises an idle or straight portion, whereby the latter portion of the movement of the rod serves simply to move the punch without turning the mandrel, substantially as herein described.

4. The combination, with a mandrel having the pinion $c^4$, with the curved slot $c^6$ in its end, and a setting-punch opposite the mandrel, of a rack-bar engaging the pinion, a rod and lever, through which the punch is moved, and a cam on said rod for operating the rack-bar, and which has an idle or straight portion, substantially as and for the purpose herein described.

5. The combination, with the mandrel C, having a slot or groove, $c^6$, to receive a stud, and a pinion, $c^4$, and the setting-punch D, with its returning-spring, of the rack-bar $f$, engaging the pinion, the lever and rod E F, for operating the punch, and the slotted cam F', having a straight or idle slot portion, and which receives a pin or roller on the rack-bar, substantially as herein described.

EDWIN B. STIMPSON, JR.

Witnesses:
FREDK. HAYNES,
HENRY J. MCBRIDE.